United States Patent
Raab

(10) Patent No.: US 10,093,215 B2
(45) Date of Patent: Oct. 9, 2018

(54) VEHICLE ARMREST STRUCTURE WITH ORGANIC FIBERS

(71) Applicant: Lear Corporation, Southfield, MI (US)

(72) Inventor: Klaus Raab, Oberding (DE)

(73) Assignee: LEAR CORPORATION, Southfield, MI (US)

( * ) Notice: Subject to any disclaimer, the term of this patent is extended or adjusted under 35 U.S.C. 154(b) by 36 days.

(21) Appl. No.: 15/207,919

(22) Filed: Jul. 12, 2016

(65) Prior Publication Data

US 2017/0015223 A1    Jan. 19, 2017

Related U.S. Application Data

(60) Provisional application No. 62/192,104, filed on Jul. 14, 2015.

(30) Foreign Application Priority Data

Jul. 12, 2016 (DE) .................... 10 2016 212 639

(51) Int. Cl.
*B60N 2/75* (2018.01)
*B60N 3/10* (2006.01)

(52) U.S. Cl.
CPC .............. *B60N 3/102* (2013.01); *B60N 2/75* (2018.02); *B60N 2/757* (2018.02); *B60N 2/767* (2018.02)

(58) Field of Classification Search
CPC ...... B60N 2/46; B60N 2/4606; B60N 2/4613; B60N 2/4633; B60N 3/102; B60N 2/75; B60N 2/753; B60N 2/757; B60N 2/767
See application file for complete search history.

(56) References Cited

U.S. PATENT DOCUMENTS

| | | | | |
|---|---|---|---|---|
| 4,867,500 A * | 9/1989 | Oosterbaan | ............ | B60J 3/0278 296/97.1 |
| D350,259 S | 9/1994 | Ayotte | | |
| 5,395,161 A * | 3/1995 | Spykerman | .............. | B60N 2/70 297/411.2 |
| 5,769,496 A * | 6/1998 | Gryp | ........................ | A47C 1/03 297/411.32 |
| 6,168,236 B1 * | 1/2001 | Chen | ...................... | A47C 7/546 297/411.2 |
| 6,283,551 B1 * | 9/2001 | Bergin | ..................... | A47C 1/12 297/411.35 |
| 8,505,997 B2 * | 8/2013 | Hipshier | ................ | B60N 3/101 296/37.8 |
| 2004/0108751 A1 * | 6/2004 | Scheidmantal | .......... | B60N 2/75 296/187.05 |

(Continued)

FOREIGN PATENT DOCUMENTS

| | | |
|---|---|---|
| DE | 102012019184 A1 | 4/2014 |
| DE | 102013002489 A1 | 8/2014 |

*Primary Examiner* — Ryan D Kwiecinski
(74) *Attorney, Agent, or Firm* — MacMillan, Sobanski & Todd, LLC

(57) ABSTRACT

A vehicle armrest includes an armrest structure with a first shell made of a natural fiber composite material. The armrest structure also includes a second shell made of a natural fiber composite material. The first shell has a first contact portion that extends toward the second shell. The second shell has a second contact portion that extends toward the first shell. The first contact portion of the first shell is connected to the second contact portion of the second shell.

7 Claims, 4 Drawing Sheets

(56) References Cited

U.S. PATENT DOCUMENTS

| | | | |
|---|---|---|---|
| 2009/0200832 A1* | 8/2009 | Kalus | B60N 2/466 296/153 |
| 2010/0289317 A1* | 11/2010 | Cone | B60N 2/753 297/411.38 |
| 2012/0223564 A1* | 9/2012 | Andersson | B60N 2/787 297/411.3 |

* cited by examiner

VEHICLE ARMREST STRUCTURE WITH ORGANIC FIBERS

CROSS-REFERENCE TO RELATED APPLICATIONS

This application claims the benefit of U.S. Provisional Application No. 62/192,104, filed Jul. 14, 2015, the disclosure of which is incorporated herein by reference. This application claims priority to German patent application No. 10 2016 212 639.3 filed Jul. 12, 2016, the entire disclosure of which is expressly incorporated herein by reference.

BACKGROUND OF THE INVENTION

The present invention relates in general to an armrest and, more specifically, to a vehicle armrest made with a structural, organic fiber material.

Vehicles such as passenger cars typically include armrests for the comfort of vehicle occupants. Often in vehicles with a bench-type seat, a center armrest is provided for use by multiple occupants of the seat. This armrest may include convenience features such as cup holders. Additionally, the center armrest is often capable of being moved between a lowered use position and a raised storage position. In the use position, the armrest is available for use by occupants on either side of the armrest, while in the storage position, the center portion of the seat is available for use by a third occupant, for example.

It is desirable that the weight of the armrest be reduced in order to help reduce total vehicle weight, but it is also desirable that the armrest meet standards for durability and stiffness. Thus, an armrest typically includes a frame or reinforcement to achieve the desired strength. This is particularly notable in a pivotal armrest, which is typically supported on a frame only at one end of the armrest. It would be advantageous to have an improved, lightweight vehicle armrest.

SUMMARY OF THE INVENTION

The invention relates to a vehicle armrest. The armrest includes an armrest structure with a first shell made of a natural fiber composite material. The armrest structure also includes a second shell made of a natural fiber composite material. The first shell has a first contact portion that extends toward the second shell. The second shell has a second contact portion that extends toward the first shell. The first contact portion of the first shell is connected to the second contact portion of the second shell.

In further embodiments of the vehicle armrest, the first shell includes a plurality of first perimeter walls that define an outline of the first shell. A first base wall is located between the first perimeter walls. A first offset wall is located between the first perimeter walls. A plurality of first ridges connect the first base wall to the first offset wall. In some embodiments of the vehicle armrest, the first base wall is non-parallel to the first offset wall. In some embodiments, the first ridge includes a first ridge wall that is non-parallel to the first base wall and is non-parallel to the first offset wall. In some embodiments, the first ridge wall extends from locally large areas to locally small areas. In some embodiments of the vehicle armrest, the first contact portion is the outermost portion of the first perimeter wall. In some embodiments, the second contact portion is the outermost portion of the second perimeter wall. In some embodiments of the vehicle armrest, the armrest structure includes a pivot rod that is fixed relative to the armrest structure and extends along a pivot axis. In some embodiments, a frame supports the pivot axis for relative pivotal movement. In some embodiments, the armrest structure includes a stop rod that is fixed relative to the armrest structure and extends substantially parallel to the pivot axis. In some embodiments, the stop rod engages the frame to limit movement of the armrest structure relative to the frame to a range of positions from a use position to a stored position. In some embodiments of the vehicle armrest, a rod connector is fixed relative to the pivot rod and fixed relative to the stop rod.

The invention further relates to a vehicle armrest structure. The vehicle armrest structure includes a first shell made of a natural fiber composite material. The first shell includes a plurality of first perimeter walls that define an outline of the first shell. A first base wall is located between the first perimeter walls. A first offset wall is located between the first perimeter walls. A plurality of first ridges connects the first base wall to the first offset wall. The armrest structure also includes a second shell made of a natural fiber composite material. The second shell includes a plurality of second perimeter walls that define an outline of the second shell. A second base wall is located between the second perimeter walls. A second offset wall is located between the second perimeter walls. A plurality of second ridges connects the second base wall to the second offset wall. A pivot rod is fixed relative to one of the first shell and the second shell and extends along a pivot axis. A stop rod is fixed relative to one of the first shell and the second shell and extends parallel to the pivot axis. The outermost portion of the first perimeter walls extends toward the second shell. The outermost portion of the second perimeter walls extends toward the first shell and is connected to the outermost portion of the first perimeter walls.

Various aspects of this invention will become apparent to those skilled in the art from the following detailed description of the preferred embodiments, when read in light of the accompanying drawings.

DETAILED DESCRIPTION OF THE PREFERRED EMBODIMENTS

Figure 1:
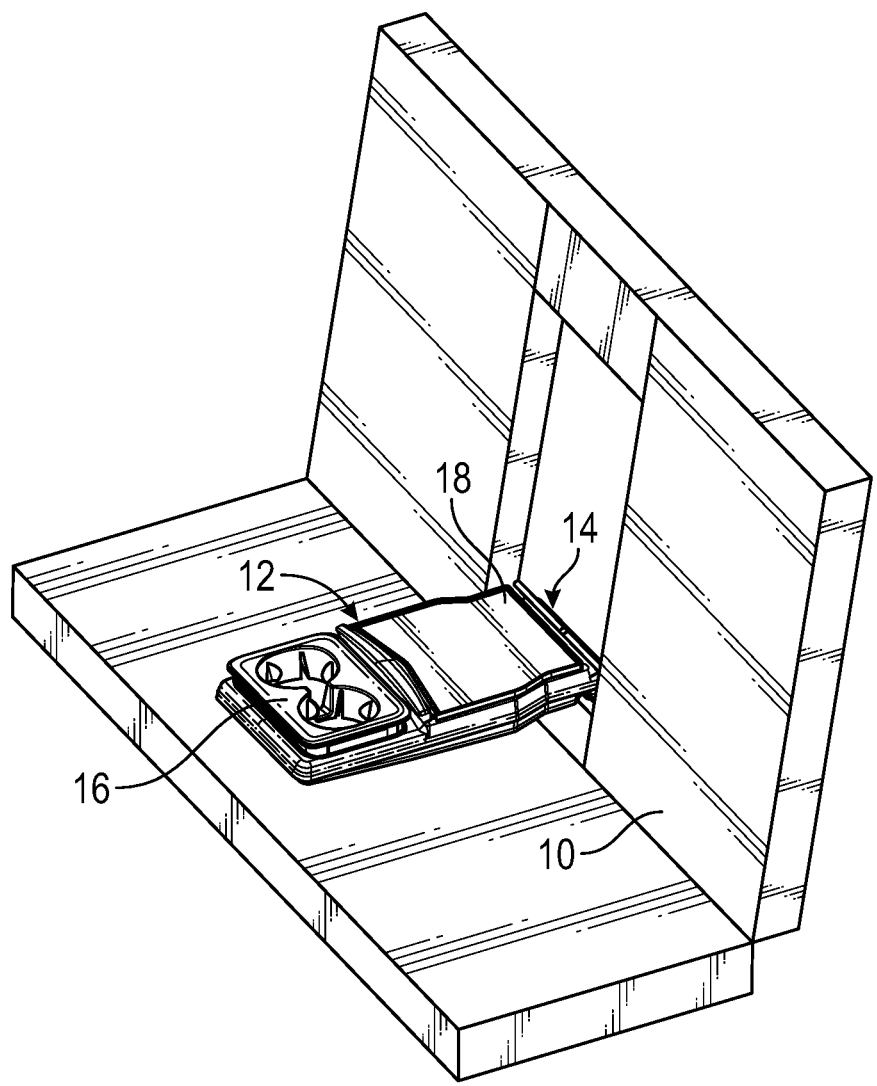
FIG. 1 is a perspective view of a bench-type vehicle seat including an armrest in accordance with this invention.

Referring now to the drawings, there is illustrated in FIG. 1 a bench-type vehicle seat 10 that includes a center armrest, indicated generally at 12. The armrest 12 is supported on a frame 14 provided on the seat 10 and is movable relative to the seat 10 between a lowered use position (shown in FIG. 1) and a raised stored position, as is well known in the art. The armrest 12 includes a cup holder 16 and a storage box 18 for use by occupants of the seat 10. The cup holder 16 and storage box 18 are shown as optional accessories provided on the illustrated embodiment of the armrest 12. The armrest 12 may include different accessories if desired, or no accessories.

Figure 2:
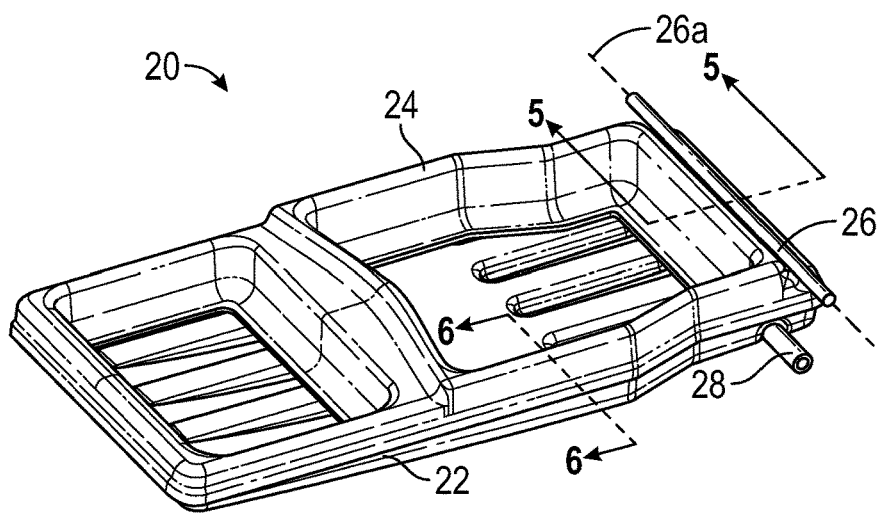
FIG. 2 is an enlarged perspective view of the armrest illustrated in FIG. 1, with a cup holder and storage box removed so that an armrest structure is visible.

Referring to FIG. 2, a perspective view of a portion of the armrest 12 is shown removed from the seat 10. The cup holder 16 and storage box 18 are also removed from the armrest 12 so that an armrest structure, indicated generally at 20, is shown. The armrest structure 20 includes a first shell 22 and a second shell 24, which will be described in detail below. The armrest structure 20 includes a pivot rod 26 that defines a pivot axis 26a and is fixed relative to the second shell 24. When the armrest 12 is attached to the frame 14 provided on the vehicle seat 10, the pivot rod 26 is supported for rotational movement relative to the frame 14, allowing the armrest 12 to pivot relative to the seat 10 about the pivot axis 26a. The armrest structure 20 includes a stop rod 28 that extends substantially parallel to the pivot axis 26a and is fixed relative to the first shell 22. When the armrest 12 is attached to the frame 14 provided on the vehicle seat 10, the stop rod 28 engages the frame 14 to limit movement of the armrest 12 relative to the seat 10 to a range of positions from the use position to the stored position, as is also well known in the art.

The second shell 24 includes a cup holder opening 30 that is configured to accommodate the cup holder 16 and a storage box opening 32 that is configured to accommodate the storage box 18. The cup holder 16 and the storage box 18 may be attached to the armrest structure 20 using adhesives, screws, or any desired connector. As previously described, the cup holder 16 and the storage box 18 are optional accessories. It should be appreciated that the armrest 12 may have different openings (not shown) as necessary to accommodate other desired accessories, or may have no openings if, for example, no accessories are provided on the armrest 12.

Figure 3:
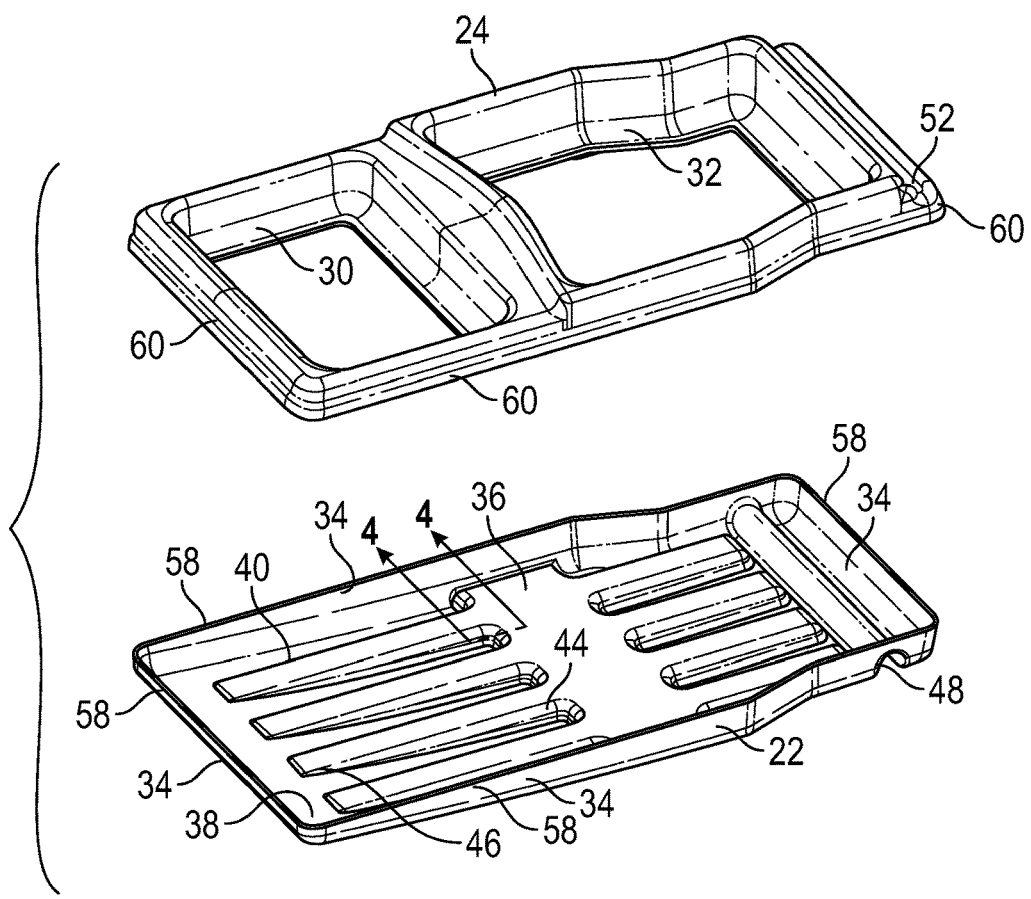
FIG. 3 is an enlarged perspective view of the armrest structure illustrated in FIG. 1 showing a second shell and a separate first shell.

Referring now to FIG. 3, the armrest structure is shown exploded so the first shell 22 and the second shell 24 are shown separately. The first shell 22 is made of a single sheet of material formed into the illustrated shape. The second shell 24 is also made of a single sheet of material formed into the illustrated shape. Both the first shell 22 and the second shell 24 are made of a natural fiber composite material. The illustrated natural fiber composite material includes a nonwoven mat of organic fibers that are impregnated with a thermosetting binder. The impregnated fibers are then pressed under heat to set the shapes of the first shell 22 and the second shell 24 respectively. In the illustrated embodiment, the organic fibers are hemp and the binder is polypropylene, but any desired fibers and binder may be used.

The first shell 22 includes a plurality of first perimeter walls 34 that define the outline of the first shell 22. The first shell 22 includes a first base wall 36 that is located between the first perimeter walls 34. The illustrated first base wall 36 extends fully between two opposed first perimeter walls 34, but the first base wall 36 may include interruptions between opposed first perimeter walls 34, if desired. The first shell 22 also includes a first offset wall 38 that is located between the first perimeter walls 34. The illustrated first offset wall 38 extends fully between two opposed first perimeter walls 34, but may also include interruptions between opposed first perimeter walls 34, if desired. The first offset wall 38 is connected to the first base wall 36 by a plurality of first ridges 40, which will be described in detail below. The illustrated first offset wall 38 is non-planar to the first base wall 36, and is non-parallel to the first base wall 36. However, the first offset wall 38 and the first base wall 36 may be parallel or coplanar, if desired.

Figure 4:
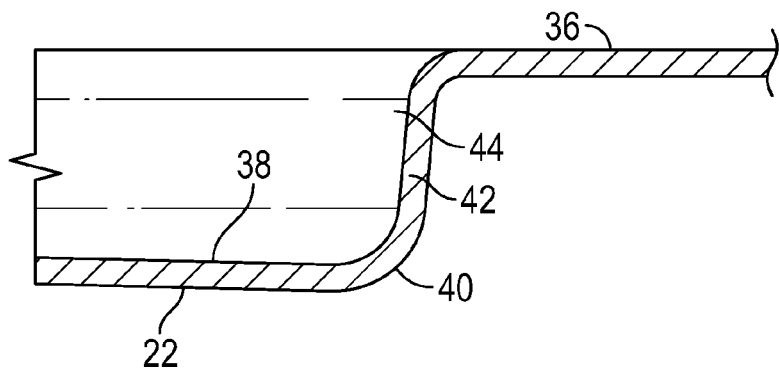
FIG. 4 is an enlarged cross-sectional view of a portion of an inner support wall of the first shell taken along line 4-4 of FIG. 3.

Referring to FIG. 4, a cross-sectional view of the first shell 22 is shown taken along the line 4-4 of FIG. 3 and through one of the first ridges 40. As shown, the first ridge 40 includes a first ridge wall 42 that is non-planar and non-parallel to the first base wall 36. Additionally, the first ridge wall 42 is non-planar and non-parallel to the first offset wall 38. It should be appreciated that the length of the first ridge wall 42 depends on the distance between the first base wall 36 and the first offset wall 38. Referring back to FIG. 3, the illustrated first ridge wall 42 includes a variable size, extending from locally large areas 44 to locally small areas 46. The locally small areas may include areas where the first base wall 36 contacts the first offset wall 38 and the first ridge wall 42 would therefore have zero height at that location.

Figure 5:
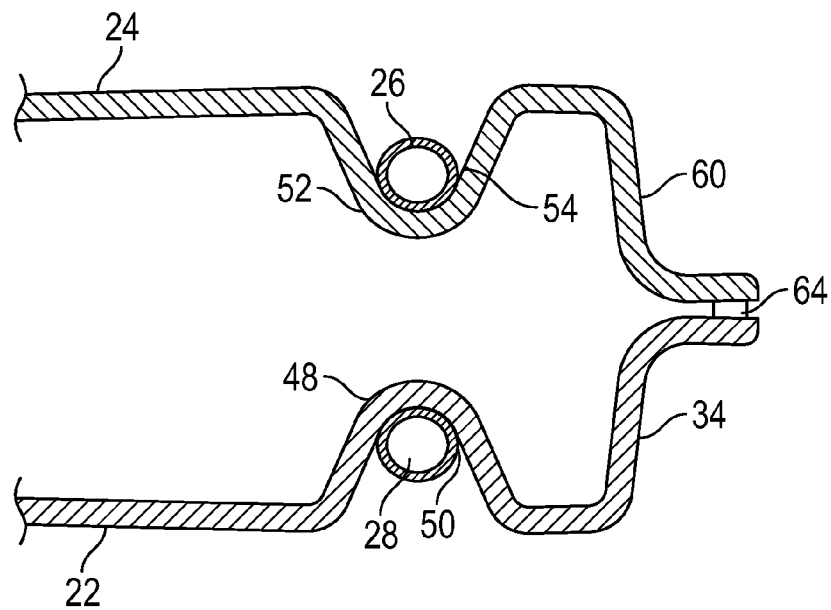
FIG. 5 is an enlarged cross-sectional view of a portion of the armrest structure taken along line 5-5 of FIG. 2.

Referring now to FIG. 5, a cross-sectional view of the armrest structure 20 taken along line 5-5 of FIG. 2 is shown, taken perpendicular to the pivot axis 26a and through the pivot rod 26 and the stop rod 28. The first shell 22 includes a first rod mount 48. The first rod mount 48 is a semi-circular shaped indentation in the first shell 22 that is sized to accommodate the stop rod 28. The first rod mount 48 may have any other desired shape which may be desirable if, for example, the stop rod 28 has a non-circular cross-sectional shape. In the illustrated embodiment, the stop rod 28 is fixed relative to the first shell 22 by an adhesive 50. However, any other desired connector may be used. The second shell 24 includes a second rod mount 52. The second rod mount 52 is a semi-circular shaped indentation in the second shell 24 that is sized to accommodate the pivot rod 26. The second rod mount 52 may have any other desired shape which may be desirable if, for example, the pivot rod 26 has a non-circular cross-sectional shape. In the illustrated embodiment, the pivot rod 26 is fixed relative to the second shell 24 by an adhesive 54. However, any other desired connector may be used.

Figure 6:
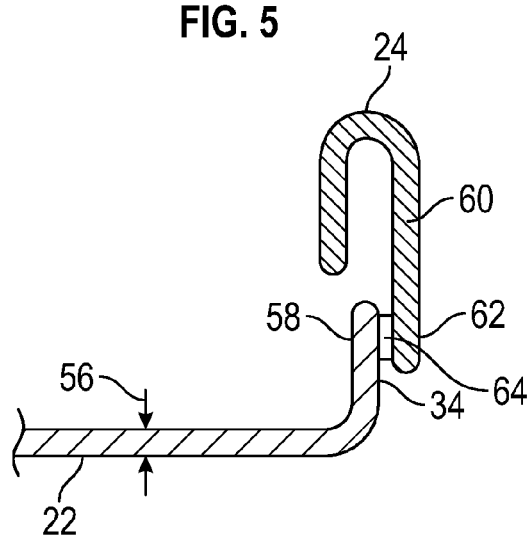
FIG. 6 is a cross-sectional view of the armrest structure taken along line 6-6 of FIG. 2 showing the connection between the first shell and the second shell.

Referring now to FIG. 6, a cross-sectional view of the armrest structure 20 taken along line 6-6 of FIG. 2 is shown. The cross-section shown in FIG. 6 is taken through one of the first perimeter walls 34 on the first shell 22 and a connection between the first shell 22 and the second shell 24. As previously described, the first shell 22 and the second shell 24 are each made of a respective single sheet of material that is formed into the respective shapes. Both the first shell 22 and the second shell 24 have a thickness 56 that is preferably within the range of 1.4 to 1.8 mm. The first shell 22 and the second shell 24 may have different thicknesses if desired, and the first shell 22 and the second shell 24 may have a thickness outside the 1.4 to 1.8 mm range, if desired. The first perimeter wall 34 includes a first contact portion 58 that extends toward the second shell 24. In the illustrated embodiment the first contact portion 58 is the outermost portion of the first perimeter wall 34, but the first contact portion 58 may be any other desired portion of the first shell 22. The second shell 24 includes a plurality of second perimeter walls 60, best shown in FIG. 3, that define the outline of the second shell 24. Referring back to FIG. 6, the second perimeter wall 60 includes a second contact portion 62 that extends toward the first shell 22. In the illustrated embodiment, the second contact portion 62 is the outermost portion of the second perimeter wall 60, but the second contact portion 62 may be any other desired portion of the second shell 24. The second shell 24 is positioned relative to the first shell 22 so that the second contact portion 62 is adjacent to the first contact portion 58, with an adhesive 64 therebetween. The illustrated adhesive is polyvinyl acetate, but any desired adhesive may be used. Alternatively, any other desired connector, such as stitches or screws, may be used to connect the first shell 22 to the second shell 24. In the illustrated embodiment, the connection between the first contact portion 58 and the second contact portion 62 provides a connection between the first shell 22 and the second shell 24 around the full perimeter of both the first shell 22 and the second shell 24.

Figure 7:
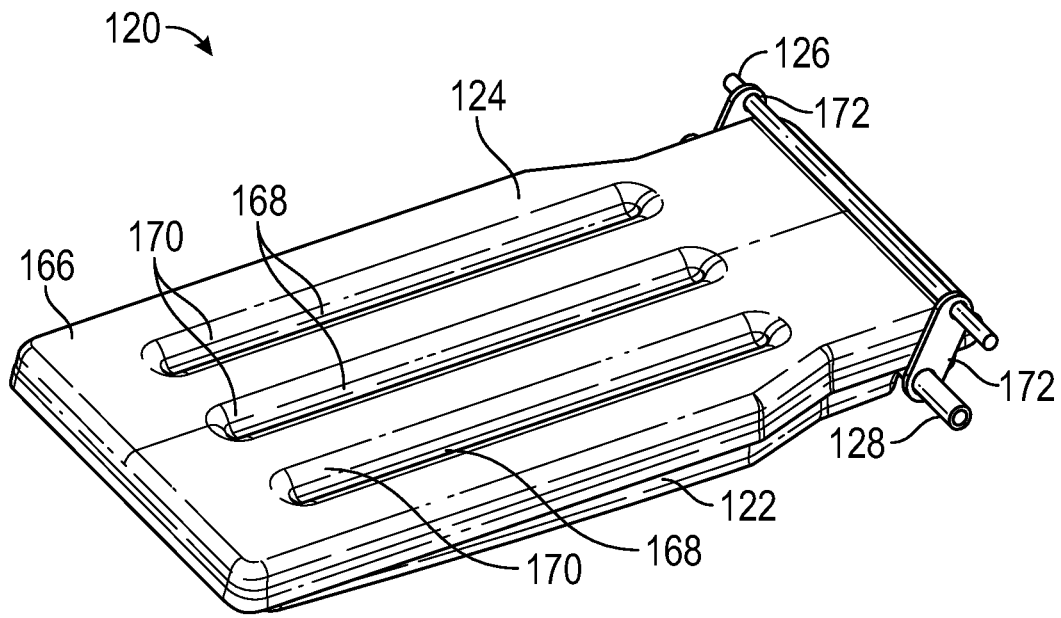
FIG. 7 is a perspective view of an alternative embodiment of an armrest structure that includes an alternative second shell.

Referring now to FIG. 7, there is shown an alternative embodiment of an armrest structure, indicated generally at 120. The alternative armrest structure is substantially similar to the armrest structure 20, and similar components will not be described in detail and are identified by the same element number with an added 100. The alternative armrest structure 120 differs from the armrest structure 20 in that it includes an alternative second shell 124 that includes a plurality of alternative second perimeter walls 160 that define the outline of the alternative second shell 124. The alternative second shell 124 includes an alternative second base wall 166 that is located between the alternative second perimeter walls 160. The illustrated alternative second base wall 166 extends fully between two opposed alternative second perimeter walls 160, but the alternative second base wall 166 may include interruptions between opposed alternative second perimeter walls 160, if desired. The alternative second shell 124 includes an alternative second offset wall 168 that is located between the alternative second perimeter walls 160. The illustrated alternative second offset wall 168 does not extend between two opposed alternative second perimeter walls 160, but is interrupted by the alternative second base wall 166. However, the alternative second offset wall 168 may extend between opposed alternative second perimeter walls 160 if desired. The illustrated embodiment includes three alternative second offset walls 168, but the alternative second shell 124 may include any desired number of alternative second offset walls 168. The alternative second offset wall 168 is connected to the alternative second base wall 166 by a plurality of alternative second ridges 170. The alternative second ridges 170 are similar to the previously described first ridges 40 and will not be described in detail.

Figure 8:
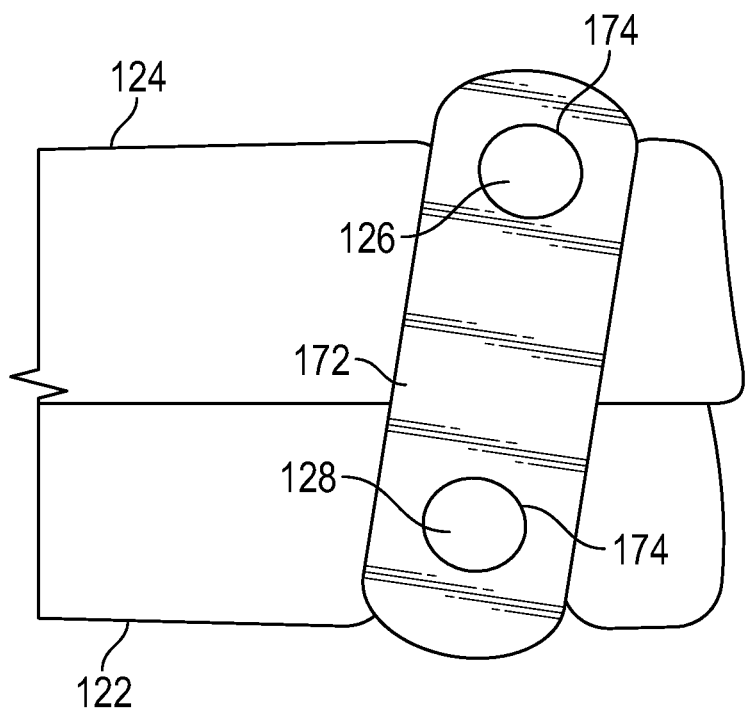
FIG. 8 is an enlarged end view of a portion of the alternative armrest structure showing a rod connection attached to a pivot rod and a stop rod.

The alternative armrest structure 120 also includes two optional rod connections 172. Referring to FIG. 8, a side view of a portion of the alternative armrest structure 120 including one of the rod connections 172 is shown. Each rod connection 172 is a stamped metal plate that includes through holes 174 that fit around an alternative pivot rod 126 and an alternative stop rod 128. The rod connection 172 is fixed relative to the alternative pivot rod 126 and the alternative stop rod 128 by press-fit, laser welding, or any desired connection. The rod connections 172 help to fix the alternative pivot rod 126 relative to the alternative stop rod 128.

The principle and mode of operation of this invention have been explained and illustrated in its preferred embodiments. However, it must be understood that this invention may be practiced otherwise than as specifically explained and illustrated without departing from its spirit or scope.

What is claimed is:

1. A vehicle armrest structure comprising:
a first shell made of a natural fiber composite material and having a first contact portion, and
a second shell made of a natural fiber composite material and having a second contact portion, wherein:
the first contact portion of the first shell is connected to the second contact portion of the second shell,
the first shell includes a plurality of first perimeter walls that define an outline of the first shell, a first base wall that is located between the plurality of first perimeter walls, a first offset wall that is located between the plurality of first perimeter walls, and a plurality of first ridges that connect the first base wall to the first offset wall,
at least one of the plurality of first ridges includes a first ridge wall that is non-parallel to the first base wall and is non-parallel to the first offset wall, and
the first ridge wall has a height that decreases along a length thereof to zero where the first base wall contacts the first offset wall.

2. The vehicle armrest structure of claim 1, wherein the first base wall is non-parallel to the first offset wall.

3. The vehicle armrest structure of claim 1, wherein the first ridge wall includes a variable size.

4. The vehicle armrest structure of claim 1, wherein the first contact portion is an outermost portion of the plurality of first perimeter walls.

5. The vehicle armrest structure of claim 1, further comprising a pivot rod that is fixed relative to the vehicle armrest structure and extends along a pivot axis.

6. The vehicle armrest structure of claim 5, further comprising a stop rod that is fixed relative to the vehicle armrest structure and extends substantially parallel to the pivot axis.

7. The vehicle armrest structure of claim 6, further comprising a rod connector fixed relative to the pivot rod and fixed relative to the stop rod.

* * * * *